Aug. 30, 1966  P. B. SHAFFER  3,270,222
VIBRATION AND NOISE ISOLATION SUPPORT AND DRIVE
Filed April 17, 1963  2 Sheets-Sheet 1
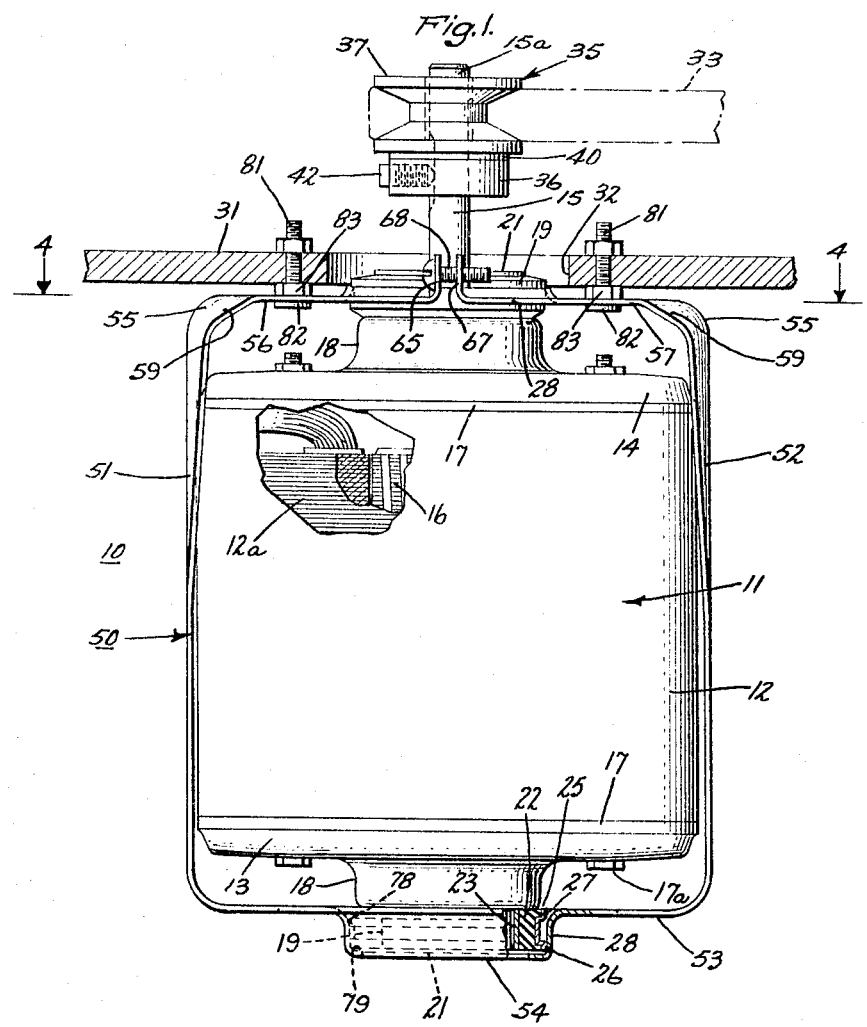
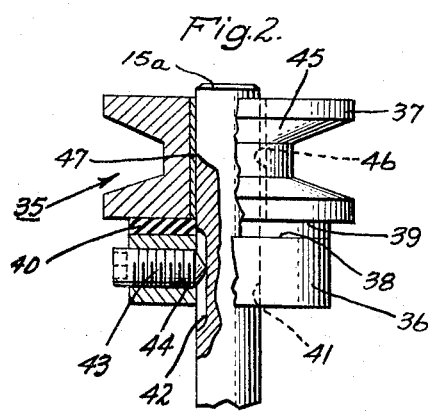
INVENTOR.
Paul B. Shaffer,
by John M. Stoudt
Attorney.

INVENTOR.
Paul B. Shaffer,
by John M. Stoudt
Attorney.

United States Patent Office 3,270,222
Patented August 30, 1966

3,270,222
VIBRATION AND NOISE ISOLATION
SUPPORT AND DRIVE
Paul B. Shaffer, De Kalb, Ill., assignor to General
Electric Company, a corporation of New York
Filed Apr. 17, 1963, Ser. No. 273,769
6 Claims. (Cl. 310—51)

This invention relates generally to an improved vibration and noise isolating system and more particularly to an improved arrangement for use with a small dynamoelectric machine for reducing the transmission of vibration and noise producing forces to its stationary supporting structure.

In the construction and support of small dynamoelectric machines, it is very desirable, if not essential, that operational noises and vibrations be kept as low as possible. This is especially true for small electric motors intended for domestic and office use, as in washing machines, fans, and other appliances. The problem of effective vibration and noise isolation becomes even more acute in those situations where the motor is suspended in a non-horizontal position from a main support of the appliance (e.g., washing machine) and has a frictional driving connection, such as a belt, with the device to be driven; e.g., clothes basket. In studying this problem, I have determined that there are two strong 120 cycle per second forces originating in the motor during operation which, if transmitted to the appliance, tend to excite certain of its component parts with a resonant frequency, such as side panels in the case of a washing machine, resulting in objectionable vibration and noise.

More specifically, using the washing machine as an example, torsional oscillations or pulsations are produced by a 120 cycle per second force of the motor rotor and shaft, which results from, at least in part, the skewing of rotor conductors. These pulsations may be transmitted through the belt and the washing machine structure to excite the side panels of the washer cabinet into vibration, creating in turn an objectionable high noise level. In addition, the axial and possibly torsional vibrations of the stator, caused by a second 120 cycle force originating in the stator and frame, may be transferred to the same side panels of the washing machine through the motor mounts and motor supporting structure. Since these two 120 cycles per second excitation forces are not in phase, both must be removed or reduced in magnitude or amplitude to achieve improved and acceptable vibration and noise levels.

In view of these factors and considerations, there has been a practical difficulty in providing a satisfactory yet relatively inexpensive arrangement which is capable of minimizing the effect of motor vibrations and 120 cycle per second forces on the driven apparatus and motor supporting structure for long periods of time, especially in those situations employing frictional type driving connections between the motor and driven device. In addition, further difficulty has been experienced in providing such an arrangement which is not only low in cost to manufacture but is also economical to install and to maintain while being practical for use in domestic and office appliances and the like. This arrangement must, at the same time, provide a high degree of radial and axial rigidity to support the motor in the appliance or other apparatus such that undesirable motion of the motor itself is prevented.

Accordingly, it is the primary object of this invention to provide an improved arrangement for effectively reducing the transmission of vibration and noise producing forces from a dynamoelectric machine during operation to the apparatus in which it is employed.

It is another object of the invention to provide an improved arrangement which provides at least some of the desirable features mentioned above.

It is a further object of this invention to provide an improved yet relatively inexpensive arrangement for reducing the transmission of motor vibrations and noise from the rotor shaft of the motor through a frictional driving connection to the device being driven.

It is yet another object of the invention to provide an improved and low cost construction for mounting an electric motor in a non-horizontal position to a supporting structure which achieves a high degree of radial and axial rigidity in the support of the motor.

It is a still further object of the present invention to provide an improved arrangement for minimizing the effect on vibration and resulting noise level in a supporting structure caused by 120 cycle per second forces generated in an electric motor, mounted to such supporting structure, during operation.

In carrying out the objects in one form thereof, I provide an improved arrangement especially effective in reducing the transmission of 120 cycle forces originating in the rotor and stator members of a dynamoelectric machine, from the machine to the equipment with which it is employed. With reference to the rotor, a power transmitting connection is mounted to the output end of the rotor shaft and comprises a pair of axially separated driving and hub elements, with the latter element being fixedly attached to rotate with the shaft. Resilient means are arranged between the elements, joining them together, to transfer power from the rotor to the driving element through the hub element and resilient material while permitting limited angular movement of the driving element relative to the shaft. The driving element includes a bearing which receives the shaft in journaled relation. Consequently, the drive member is fully supported by the shaft as it rotates therewith, yet is allowed limited and journaled angular movement relative to the shaft on which it is carried.

By a further aspect, the stator includes a frame having a pair of hub portions at each of its ends which mount resilient cushion rings. A base, formed from sheet material, supports the machine in a firm fashion relative to the equipment in which it is mounted, and along with the resilient cushion, effectively reduces the transmission of 120 cycle vibration producing forces from the stationary member of the motor.

The base is provided with a generally U-shaped configuration and includes opposed leg sections integrally joined at one end by a bight section which is formed with a recess for mounting one of the cushion rings. The leg sections are flexible relative to the bight section and the free ends remote from the bight section project toward each other to furnish a pair of cooperating clamping sections which, due to the flexible nature of their associated leg sections, permit assembly and disassembly of the motor and the base. The clamping sections are adapted to engage the other cushion ring and to hold it firmly therebetween so that both ends of the motor are firmly supported by a relatively inexpensive yet highly effective construction.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings:

FIG. 1 is a side view, partially in section and partially broken away of an electric motor mounting and base structure embodying one form of the present invention;

FIG. 2 is an enlarged view, partially broken away, of the output end of the shaft seen in FIG. 1, with the V-belt removed to show detail;

Figure 3:
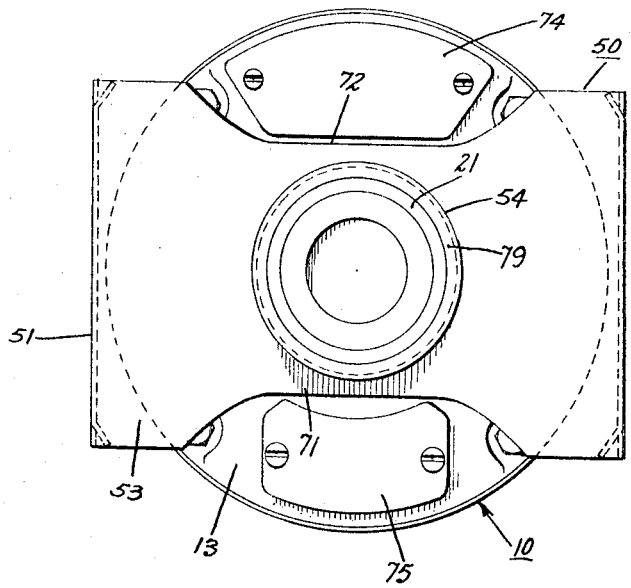
FIG. 3 is a bottom view of the motor and mounting base arrangement shown in FIG. 1.

Referring now to the drawings in more detail, numeral 10 identifies an electric motor of the type commonly employed to operate domestic washing machines and other apparatus having relatively small electrically driven loads, such as a rotatable clothes basket in the case of washing machines. For purposes of explaining the preferred embodiment of my invention, motor 10 is of the single phase split phase induction type, conventionally formed with an outer stator and rotor supporting frame 11. The frame includes a central housing 12 surrounding stator 12a and end shield assemblies 13, 14, for journaling rotor shaft 15, which mounts rotor member 16, shown as being of the induction squirrel cage type. Each end shield is secured at an end of the central frame by any suitable means, such as by a rabbeted connection 17 and a number of through-bolts 17a. Shaft 15 extends outwardly of and beyond end shield assembly 14 to provide an outboard or output shaft end 15a. Further, in the illustrated form, each of the end shield assemblies includes an integral cylindrical bearing housing 18 for supporting shaft carrying bearings (not shown) in the usual way and a somewhat smaller hub portion 19 formed on the external side of housing 18, concentric with the axis of rotation of shaft 15. Hub 19 accommodates a resilient motor mount 21 for cushioning motor vibrations by circumferential shear of the resilient material.

The illustrated mount is of the type shown and described in United States Patent No. 2,074,136 issued to A. F. Welch and comprises an annulus or ring 22 of resilient material such as rubber having a continuous annular metal band 23 bonded to its inner surface to furnish a rigid inner surface for attachment to hub 19 by forcing band 23 over the hub. A split metal band 25 having spaced ends 26, 27 separated by a circumferential groove 28 is secured, as by bonding, to the outer surface of annulus 22.

In the present exemplification of my invention, motor 10 is shown suspended with its shaft axis of rotation disposed substantially vertical, from a horizontal wall 31 of a stationary supporting structure in a washing machine, only partially illustrated in FIG. 1. Wall 31 has a circular opening 32 through which shaft output end 15a projects to provide the means for driving a clothes basket (not shown) through a V-belt type flexible frictional driving connection 33, indicated by the broken lines.

By one aspect of my invention, I provide shaft output end 15a with an inexpensive assembly or power transmitting unit, denoted generally by numeral 35 in the drawings and best seen in FIG. 2, which drastically reduces the transmitted magnitude of the 120 cycle per second forces attributable to the rotor and shaft through the flexible driving connection. In the preferred form, assembly 35 comprises axially spaced apart hub and pulley components or elements 36 and 37, each formed in a single piece of inherently strong material; e.g., cast of iron. Resilient material, such as rubber washer 40, is arranged in the space between the two sections and is bonded, vulcanized, or otherwise permanently fastened to side surfaces 38 and 39 of the respective elements which are in opposed facing relation. This material serves to isolate the elements axially, one from the other, permits a limited oscillatory movement of pulley element 37, and unites the parts into an integral unit. I have found for appliance applications requiring a motor having a rating of ⅓ horsepower, the surface area of surfaces 38, 39 and the size of resilient washer 40 connected thereto should be sufficient to transfer a torsional force through the unit in the order of 70 inch-pounds, while allowing controlled angular movement of pulley element 37 on shaft end 15a.

Hub element 36 is in effect a collar having a cylindrical construction and a central bore 41 extending therethrough to furnish a slip fit with shaft end 15a for facilitating the mounting of assembly 35 onto the shaft. Any suitable means may be employed to hold the hub onto shaft 15 for revolution therewith, as by the illustrated shaft recess 42, set screw 43 and cooperating threaded hole 44 projecting radially through the hub element.

With respect to the preferred construction of pulley element 37, it is generally annular in configuration and includes a V-belt accommodating circumferential groove 45 on its outer periphery and an enlarged central bore 46, axially aligned with reference to hub bore 41. A sleeve type bearing 47, composed of bronze or other suitable material, is tightly received within bore 46 and provides a journaled support for the pulley element on shaft end 15a.

During operation of motor 10, controlled torsional or limited oscillatory shaft-supported and journaled motion of pulley element 37 relative to both the shaft 15 and the attached hub element 36 is achieved by the interaction of the component parts described above, resulting in a reduction of rotor-shaft 120 cycle per second vibration producing forces transmitted to V-belt 33. Further, even though pulley element 37 is permitted the journaled but limited angular movement on the shaft, the motion does not interfere with the power transferring capability of the unit, from the output shaft end 15a to the V-belt 33.

Figure 4:
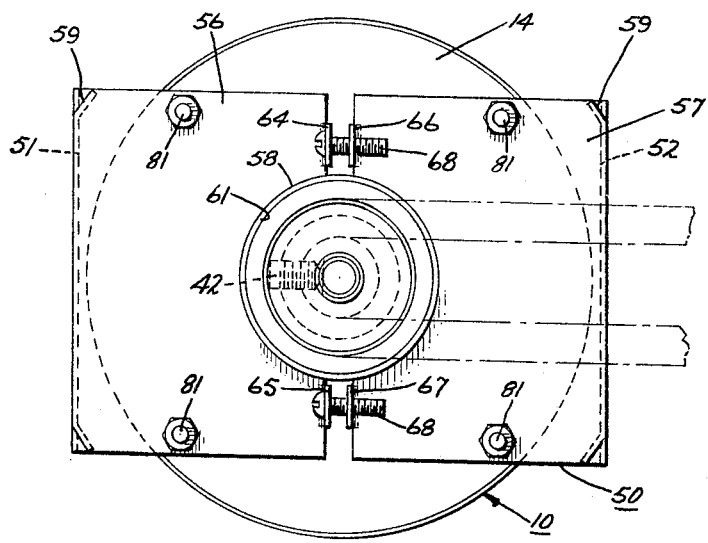
FIG. 4 is a view taken along line 4—4 in FIG. 1 to show additional details of the motor and mounting base construction.

In order to reduce the transmission 120 cycle forces created in the stator during motor operation and to support motor 10 in a rigid manner, I provide an improved motor base, the preferred form being indicated generally by numeral 50 in FIGS. 1, 3, and 4. The illustrated base may be inexpensively fabricated by standard punching and bending operations from a single sheet of relatively thin somewhat flexible rectangular shaped material preferably having spring-like characteristics such as sheet steel, which for motors having a ⅓ horsepower rating, may be in the order of 0.059 inch thick.

The base is somewhat U-shaped in configuration, comprising a pair of generally parallel side or leg sections 51 and 52, spaced apart by an amount slightly greater than the outer diameter or dimension of motor frame 11. As best seen in FIGS. 1 and 3, leg sections 51 and 52 are integrally joined at their bottom ends (as viewed in FIG. 1) by a bight section 53 formed with an extruded pocket or recess 54 for accommodating motor mount 21 of end shield assembly 13. At their upper ends, sections 51, 52 are each bent over toward the other in opposed relation at 55 to provide a pair of mirror imaged but reversely movable cooperating clamping sections 56 and 57, shown in FIGS. 1 and 4. These clamping sections, due to the inherent nature and cross section thickness of the base, are somewhat flexible relative to the bight section and ar capable of movement toward and away from each other to permit ready assembly of the base with the motor. A downwardly curved flange portion 59 may extend along each lateral edge of the upper part of sections 51 and 52 to a point beyond bend 55 on the side edges of the clamping sections 56 and 57 for augmenting the rigidity of the clamping sections relative to their respective associated leg sections.

Each clamping section includes an arcuate or curved recess 61 centrally of its transverse edge 62. Recess 61 has its perimeter provided in complementing relation within groove 28 of the motor mount band 25 and is adapted to be accommodated by a portion of the circumferential length of the groove, slightly less than 180°. In order to fasten or clamp motor mount 21 tightly between clamping sections 56 and 57, the transverse edges 62 of the respective clamping sections are each furnished with a pair of upstanding tabs 64, 65 and 66, 67 respectively, one disposed on either side of recess 61 for each clamping section. Tabs 64 and 66 have aligned holes, with the hole in tab 66 being threaded to receive the threaded part of screw 68 which projects through tab 64. Tabs 65 and 67 on the other side of the motor mount are of similar construction, the pair of screws 68 firmly holding sections 56 and 57 together in opposed and assembled clamping relation.

Motor 10 may be conveniently installed within base 50 by merely separating clamping sections 56, 57, which tend to flex relative to bight section 53, and then placing the motor in the space between legs 51, 52, with its bottom mount 21 (as viewed in FIG. 1) inserted into walled recess 54. It should be noted at this point that I prefer to cut out material on either side of the recess in the bight section, as indicated at numerals 71, 72 in FIG. 3, to reduce the transverse dimension in this region. This construction assists the flexing action of sections 56, 57 during assembly of the base and the motor. In addition, for those motors incorporating a motor control switch, such as that disclosed and described in Patent No. 2,442,227 issued to G. D. Willits, it allows ready admittance to plate 74, which covers the switch access opening formed in end shield 13, and provides an unobstructed view of the motor nameplate 75 normally attached to the end shield at the "switch end" of the motor which usually carries useful operating information concerning the motor itself.

Referring now more specifically to the illustrated configuration of the resilient mount accommodating recess 54 in bight section 53, it will be seen from an inspection of FIG. 1 that I prefer to form the inner wall 78 of the recess with a frusto-conical shape, having its greatest diameter or dimension at the entrance thereto, and provide a central hole in the bottom wall of the recess to form flange 79. In this way the bottom part (as viewed in FIG. 1) of inner wall 78 and flange 79 together tightly engage band end 26, preventing interference with the assembly and disassembly of the motor with base 50 while still achieving a firm support. Referring once again to FIGS. 1 and 4, once motor 10 has been installed into base 50 in the manner previously described, the assembled unit may conveniently be mounted vertically beneath wall 31 by a low cost arrangement without adversely affecting the satisfactory isolation of the 120 cycle per second stator-frame forces attained with my invention. In the illustrated exemplification, two spaced apart standard type bolts 81 are suitably connected to the section, as by bolt heads 82 and nuts 83, the nuts functioning to space the assembly from wall 31. Bolts 81 project upwardly through the wall and suspend the motor beneath it, with shaft end 15a and power transmitting unit 35 disposed above the wall.

The following example is given in order to illustrate more clearly how my invention, as described above, has been satisfactorily carried out in actual practice, the results being representative of tested arrangements which included my invention. Motor 10 was suspended from a washing machine horizontal wall or platform in the manner shown in the drawings. The arrangement included a base and pulley constructed in accordance with the preferred form already described. The motor was a single phase resistance induction type, rated at ⅓ horsepower, 60 cycle, 115 volt and having a ½ inch diameter (nominal) shaft. The hub element 36 of unit 35 was 1.5 inches in diameter, with resilient washer of ⅛ inch in cross section thickness being vulcanized to surfaces 38, 39, and capable of transmitting a torque in excess of seventy-four inch-pounds. The bearing for journaling pulley element 37 on the output end 15a of the shaft was a commercially available oil retaining porous sleeve type bronze bearing. The vibration and noises resulting from the 120 cycle forces originating in the motor were recorded on a chart in the well known way and compared with the same motor employing a conventional solid pulley and hub assembly and a base and cushion ring construction, such as that shown and described in Patent No. 2,074,136, Welch. The following is a tabulation of the results, the readings being an average of many tests and given in decibels with the higher order of numbers indicating higher noise levels:

| Conventional Power Transmitting Unit and Base | Base 50 and Conventional P. T. Unit | Base 50 and Unit 35 |
|---|---|---|
| 66.5 | 56.5 | 47.0 |

From this tablulation, it will be appreciated that my invention reduces vibration and noises to an acceptable level in spite of the fact that the component parts in my improved arrangement are relatively inexpensive to manufacture in mass production quantities and are readily assembled with motor 10.

From the foregoing, the advantages and features of my invention will be readily manifest. Among other things, the two 120 cycle per second excitation forces originating in the motor, which produce torsional oscillations or pulsations and axial vibrations, are effectively reduced in magnitude and amplitude during transmission to achieve improved vibration and noise operating levels. In addition, even though the motor may be suspended in a non-horizontal position from a stationary supporting structure in the equipment in which it is employed and may include a frictional type driving connection, such as a belt, a high degree of radial and axial rigidity in mounting of the motor is attained by my invention. Moreover, the components of my arrangement are inexpensive to manufacture, yet permit economy of time and labor during assembly with the motor.

While in accordance with the Patent Statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In an arrangement for controlling the transmission of vibration and noise producing excitation forces from a dynamoelectric machine to its supporting structure; said dynamoelectric machine including a rotatable member having a shaft, a stationary member carrying a resilient machine mount at each of its ends; a base for attaching said machine to a supporting structure, said base being formed from sheet material and having a generally U-shaped configuration including opposite spaced apart leg sections and a bight section joining said leg sections together at one end, said bight section being formed with a recess mounting one of said resilient mounts, the free ends of said leg sections remote from said bight sections projecting toward each other to form a pair of movable cooperating clamping sections, said leg sections being flexible relative to said bight section allowing movement of said clamping sections toward and away from each other to permit installation of the other resilient mount therebetween, and means securing said clamping sections firmly to said other resilient mount whereby said machine is firmly supported by said base and the transmission of vibration and noise producing forces originating in said stationary member is controlled; and a driving connection unit carried on said shaft for transferring power therethrough and for controlling the transmission of vibration and noise producing forces of said rotatable member, said unit comprising a pair of axially separated driving

7 and hub elements, means fixedly attaching said hub element to said shaft for rotation therewith and resilient means disposed therebetween and joining said elements together in power transferring relation while permitting limited relative angular movement of said elements, whereby said driving element is furnished with limited angular movement relative to said shaft while rotating therewith.

2. In an arrangement for controlling the transmission of vibration and noise producing excitation forces from a dynamoelectric machine to its supporting structure; said dynamoelectric machine including a rotatable member having a shaft with an output end; a stationary member carrying first and second resilient machine mounts, one at each end thereof; and a base for suspending said machine from the supporting structure with its shaft disposed in a generally vertical direction; said base being formed from sheet material and having a generally U-shaped configuration including opposite spaced apart leg sections and a bight section joining said leg sections together at one end, said bight section being formed with a pocket mounting said first resilient mount, the free ends of said leg sections remote from said bight sections projecting toward each other to form a pair of movable cooperating clamping sections, said leg sections being flexible relative to said bight section thereby allowing movement of said clamping sections toward and away from each other to permit installation of said second resilient mount therebetween, means securing said clamping sections firmly to said other resilient mount whereby said machine is firmly supported by said base, and each of said clamping sections having means for attaching said base to the supporting structure; a power unit carried on said output end of said shaft for transferring power therethrough and for reducing the magnitude of the transmitted noise producing forces from said rotatable member, said unit comprising a pair of axially separated pulley and hub elements, means fixedly attaching said hub element to said shaft for rotation therewith, resilient means connecting said elements together in power transferring relation while allowing limited angular movement of said pulley element, said pulley element including means for journaled support on said shaft output end whereby said pulley element is furnished with a journaled limited angular movement relative to said shaft while rotating therewith.

3. In an arrangement for controlling the transmission of 120 cycle per second excitation forces from an electric motor to its supporting structure; said motor including a rotor having a shaft, a stationary member including a stator and frame carrying first and second resilient motor mounts, a mount disposed at each end of the motor; a base for attaching said machine to a supporting structure, said base being formed from sheet steel material and having a generally U-shaped configuration including opposite spaced apart leg sections and a bight section joining said leg sections together at one end, said bight section being formed with a pocket mounting said first resilient mounts and being of reduced width in the region of said pocket, the free ends of said leg sections remote from said bight section projecting toward each other to form a pair of movable cooperating clamping sections, the transverse edge of each clamping section having a curved configuration to complement a part of the outer periphery of said second resilient mount, said leg sections being flexible relative to said bight section thereby allowing movement of said clamping sections toward and away from each other to permit installation of said second resilient mount between the curved transverse edges of the respective clamping sections, and means securing said curved transverse edges and second resilient mount firmly together in frictional engaging relation whereby said motor is supported by said base and the transmitted magnitude of the 120 cycle forces originating in the stator are reduced; and a power transmitting unit disposed on said shaft for transferring power therethrough and for preventing the transmission of noise producing 120 cycle per second forces from said rotor, said unit comprising a pair of axial spaced apart pulley and hub elements, means fixedly attaching said hub element to said shaft for rotation therewith, and a resilient washer disposed in the space between said pair of elements and bonded thereto for connecting said elements together in power transferring relation while allowing limited angular movement of said pulley element relative to said hub element, said pulley element including a central sleeve type bearing journaled on said shaft whereby said driving element is supported on said shaft and has limited angular movement relative thereto while rotating with the shaft.

4. For use with a dynamoelectric machine including a stationary member; a single piece base for attaching said machine to a supporting structure, said base being formed from sheet material and having a generally U-shaped configuration including opposite spaced apart leg sections and a bight section joining said leg sections together at one end, said bight section being formed with a recess for mounting one end of the stationary machine, the free ends of said leg sections remote from said bight sections projecting toward each other to form a pair of movable cooperating clamping sections, said leg sections being flexible relative to said bight section thereby allowing movement of said clamping sections toward and away from each other to permit installation of the other end of the stationary member therebetween, and means arranged to secure said clamping sections firmly to the other end of the stationary member whereby the machine is firmly supported by said base.

5. A dynamoelectric machine including a rotatable member having a shaft, a stationary member carrying first and second resilient machine mounts, and a single piece base for attaching said machine to a supporting structure with the shaft being disposed in a generally vertical direction, said base being formed from sheet material and having a generally U-shaped configuration including opposite spaced apart leg sections and a bight section joining said leg sections together at one end, said bight section being formed with a pocket mounting said first resilient mount, the free ends of said leg sections remote from said bight section projecting toward each other to form a pair of movable cooperating clamping sections, said leg sections being flexible relative to said bight section allowing movement of said clamping sections toward and away from each other to permit installation of said second resilient mount therebetween, means securing said clamping sections firmly to said second resilient mount, and means carried by said clamping sections for attaching said base to the supporting structure whereby said machine is firmly supported by said base with the axis of its shaft extending in the generally vertical direction.

6. A dynamoelectric machine including a stationary member carrying a pair of resilient machine mounts, one at each of its ends, and a single piece base for attaching said machine to a supporting structure, said base being formed from sheet material and having a generally U-shaped configuration including opposite spaced apart leg sections and a bight section joining said leg sections together at one end, said bight section being formed with a pocket mounting one of said resilient mounts by frictional engagement therewith, the free ends of said leg sections remote from said bight sections projecting toward each other to form a pair of movable cooperating clamping sections, said clamping sections each formed with a transverse edge having a portion curved in configuration, said curved portions being in opposed relation and conforming in shape to the outer periphery of the other resilient machine mount, said leg sections being flexible relative to said bight section allowing movement of said clamping sections toward and away from each other to permit installation of said other resilient mount therebetween, and means clamping said clamping sections firmly to the outer periphery of said other resilient mount whereby said machine is firmly supported by said base.

References Cited by the Examiner
UNITED STATES PATENTS

| | | | |
|---|---|---|---|
| 2,074,136 | 5/1934 | Welch | 248—26 |
| 2,047,838 | 7/1936 | Smith | 310—51 X |
| 2,057,370 | 10/1936 | Dehlendorf | 310—51 |
| 2,096,139 | 10/1937 | Spahr | 310—51 X |
| 2,209,477 | 7/1940 | Reihel | 248—26 |
| 2,620,151 | 12/1952 | Peters | 310—51 |
| 3,058,371 | 10/1962 | Haushalter | 74—574 |
| 3,078,737 | 2/1963 | McGavern | 74—574 |

MILTON O. HIRSHFIELD, *Primary Examiner.*

ORIS L. RADER, *Examiner.*

J. W. GIBBS, *Assistant Examiner.*